United States Patent [19]
Sakuta

[11] Patent Number: 4,575,468
[45] Date of Patent: Mar. 11, 1986

[54] SEALING-CURING AGENT FOR PROTECTING CONCRETE AGAINST INITIAL DRYING, SHRINKING AND CRACKING

[76] Inventor: Seiji Sakuta, 3-3-1104, Kamiyoga 2, Setagaya-ku, Tokyo, Japan

[21] Appl. No.: 620,399

[22] Filed: Jun. 13, 1984

[51] Int. Cl.$^4$ .......................... B05D 3/02; C08K 5/12
[52] U.S. Cl. .................................. 427/393.6; 524/285
[58] Field of Search ...................... 524/285; 427/393.6

[56] References Cited
U.S. PATENT DOCUMENTS 3,709,867  1/1973  Karabinos et al. .................. 524/285

FOREIGN PATENT DOCUMENTS 53-74537  7/1978  Japan .................................. 524/285

*Primary Examiner*—Lewis T. Jacobs
*Attorney, Agent, or Firm*—Fidelman, Wolffe & Waldron

[57] ABSTRACT

A sealing-curing agent is prepared by diluting with a solvent of 60–70% a solute formed by mixing lanolin and a metal salt such as zinc naphthenate in a ratio of 2:1 and further adding thereto 2–5%, based on the total of all the components used, of a synthetic resin and 10–20%, based again on the total, of xylol or some other similar substance, all by weight proportions, and polymerizing the resultant mixture under application of heat.

8 Claims, No Drawings

SEALING-CURING AGENT FOR PROTECTING CONCRETE AGAINST INITIAL DRYING, SHRINKING AND CRACKING

This invention relates to a sealing-curing agent for protecting concrete against initial drying, shrinking and cracking.

With hydraulic cemental substances such as mortars and concretes, it is inevitable that during the initial stage of their hydraulic setting, they emit water possibly to a point where they dry, shrink and consequently sustain cracks. To prevent them from rapid drying during the initial stage of hydraulic setting, therefore, there has been practised the so-called underwater curing, i.e. a treatment which involves immersing them in water immediately after their release from the molds. This practice, however, has its own limits associable with such factors as weight and volume. Particularly structures built outdoors in huge dimensions defy the underwater curing despite the fact that the treatment would prove to be all the more necessary and important for these structures, among all others. There has been adopted instead a primitive measure of spraying them with water at frequent intervals and covering them with sheets between the spraying works.

Steam curing, a treatment which entails enormous expenses for temporary construction and fuel, is adopted in some cases when the importance of the outcome of the treatment for structures justifies the financial burden. Despite the fact that the steam curing fails to manifest its effect fully unless it is performed for a fairly long time, this treatment is discontinued, not infrequently, at a halfway point because of limited fuel or time allowance.

Although the underwater curing is capable of curbing both dryng and shrinking, it causes free lime, a substance indispensable to the manifestation of strength, to be dissolved out into water nearly completely wile concretes or mortars remain under water. This loss of free lime, accordingly, constitutes itself a serious demerit for structures which are expected to possess strength. In this respect, the underwater curing cannot be called a perfectly ideal treatment.

The inventor has carried out a diligent study devoted to the development of achieving a perfect curing of cementitious products in all respects and which would be applicable particularly to huge outdoor structures which require a proper curing under any circumstances. The inventor in accordance with the present invention has succeeded in developing a new and novel method for curing hydraulic cementitious products and a new and novel curing agent for use in achieving the desired objective.

To be more specific, this invention comprises coating the surface of a concrete structure immediately after its placement with a resin solution possessed of specific properties thereby forming on the surface of the structure a watertight pressure layer proof, completely precluding escape of free water from the structures and thoroughly eliminating dryng and shrinking and consequently occurrence of cracks.

Generally, for curing to be carried out to perfection and to the extent of manifesting its effect fully, the various requirements enumerated below must be fullfilled as preconditions.

1. While the water contained in the structure is vaporized and expelled out of the structure because of a temperature difference between the ambient air and the structure, the vaporization is attended by generation of considerable pressure. Thus, the structure should be capable of withstanding this pressure.

Unlike the principle of ordinary waterproofing, the structure is required to offer stronger resistance to the back pressure (inner pressure) than to the pressure from the front side (outer pressure).

2. Since the curing, when performed after the structure has dried up, has neither significance nor effect, it should be capable of being carried out while the structure is still in the early stage of its wet state.

3. The curing should possess high workability enough to provide required treatment quickly to the structure no matter how complicated the structure's contour may be or how huge the structure may be and yet should be simple enough to preclude the possibility of misperformance.

4. The curing should be capable of producing lasting effect for at least about three months (90 days≈13 weeks) until the structure is stabilized materially and chemically to a tolerable extent. Otherwise, the treatment cannot be expected to provide perfect curing of the structure.

5. When a coat is formed on the surface of the structure, the continuous construction work is suspended and the removal of this coat on fulfilment of its function entails a work of surface cleaning. This evidently means that the construction cost is increased by the labor cost required for this extra work and the scheduled period of construction is lengthened by the suspension of work. The coat thus applied to the structure should not be of a type which requires a cleaning work.

6. The curing treatment should be capable of producing a perfect curing effect and further waterproofing the structure and preventing the structure from neutralization. Then the curing ought to be truly ideal for structures requiring permanent durability.

After many years' diligent study aimed at satisfying all these requirements, it has now been found that their collective satisfaction issues from providing a novel curing agent to be described fully below. Thus, this is a literally epochal invention capable of solving all the problems.

To be specific, this invention relates to a sealing-curing agent for protecting concrete against initial drying, shrinking and consequent occurrence of cracks, characterized by having diluted with a solvent of 60-70% a solute formed by mixing lanolin and zinc naphthenate in a ratio of 2:1 and further adding thereto 2-5%, based on the total of all the components used, of a synthetic resin and 10-20%, based again on the total, of xylol or some other similar substance, all by weight proportions, and polymerizing the resultant mixture under application of heat.

Now, one typical embodiment of this invention will be described in detail below.

| Component | Proportion by weight |
| --- | --- |
| (1) Lanolin | 12 to 18% |
| (2) Zinc naphthenate | 6 to 9% |
| (3) Xylol | 10 to 20% |
| (4) Styrene resin | 2 to 5% |
| (5) Kerosene | 60 to 70% |

A solute is formed by mixing the components (1), (2), (3) and (4) indicated above and polymerizing the resultant mixture under application of heat, and the polymerized solute is diluted with the solvent (5) indicated above to produce the agent of this invention.

Optionally at the time of the polymerization, about 10% of acetone, methyl-ethyl ketone or polypropylene glycol may be added to the mixture for the purpose of accelerating the polymerization. With a view to precluding the possibility of such an additive bringing about an adverse effect upon the ambience during the application of the agent to the structure under treatment, it has been found advisable to optimize the polymerization by regulating the reaction temperature and the reaction velocity instead of incorporating the additive.

Lanolin as the component (1) in the foregoing formulation, satisfies the requirement that this component should combine the two functional groups, i.e. the hydrophilic group and the oleophilic group.

As the component (5) of the formulation, the aforementioned solvent, kerosene, could be substituted by xylol. Xylol, however, emits a highly offensive odor and exhibits pungency and therefore, has a possibility of impairing the ambience during the application of the agent to the structure under treatment. Accordingly, it has been found advisable to use kerosene which possess mild properties. Although xylol and kerosene more or less differ in dissolving power and volatility, their actual effects upon the function of the produced agent are practically even. In many experiments, kerosene has been shown to excel xylol in some, if not all, respects. Hence, kerosene was adopted.

Styrene resin has been selected to serve as the component (4) of the formulation. For the resin to serve satisfactorily as the filler in the formulation, it does not matter what physical strength it may exhibit. It has only to fulfil the requirement that it should be insoluble in water. Thus, acryl, melamine, alkyd and urethane resins may be used in the place of styrene resin.

As described above, the sealing-curing agent of this invention for protecting a concrete structure against initial drying and shrinking and consequent occurrence of cracks is produced by diluting with a solvent of 60-70% a solute which is prepared by mixing lanolin and zinc naphthenate in a ratio of 2:1 and further adding thereto 2-5%, based on the total of all the components used, of a synthetic resin and 10-20%, based again on the total, of xylol or some other similar substance, all by weight proportions, and polymerizing the resultant mixture under application of heat. In other words, the present invention does not contemplate simply by coating the surface of a structure with a solution. The solution of the present invention has as its solution a polymer formed of a high molecular synthetic resin, lanolin and zinc naphthenate. This solution, when applied to the surface of a structure in which the free water contained as dispersed therein has given rise to a reticularly distributed fine voids, penetrates deeply into the structure by means of a surface tension of 30 dynes, a value about twice the surface tension (72 dynes) of water. With the subsequent evaporation of the solvent, the solute of the solution remains and fills up these voids. The solute filling the voids, therefore, is allowed to manifest high resistance (3 kg/cm$^2$=30 meters of water column as determined by an official test) to not only the outer pressure but also the inner pressure (back pressure).

The agent of the present invention is of an oily type using a solvent of the petroleum origin. The concrete structure, though dry on the surface, has its interior in a set state having about 60% of water content. The curing treatment, therefore, must meet the requirement it should perform satisfactorily no matter whether the concrete structure may be in a dry state or in a wet state. With due consideration paid to this particular requirement, the present invention has a hydrophilic group as well as an olephilic group imparted to the solution. The agent of this invention, accordingly, can be applied directly to the wet surface of a concrete structure freshly released from a mold. When the concrete structure happens to be in a dry state, the agent may be applied to the surface of the structure after the structure has been sprayed with fresh water and brought into a state of forced wetness. Because of the hydrophilic group contained therein, the oily solution can be satisfactorily applied to the structure without being repelled by the water adhering to the surface.

Further, since the agent of this invention is a free-flowing liquid having a surface tension of 30 dynes, it can be applied effectively by use of a brush, a sprayer or a roller, for example. Thus, it is allowed to disperse and penetrate evenly in the structure no matter how complicated the structure's contour may be. The treatment is simple enough to preclude the possibility of misoperation. The persons who engage in the application of the agent to the concrete structures are not required to be skilled. Thus, the agent of this invention enjoys very high workability, saves labor and promises high economy.

The filler contained in the agent of this invention, after being loaded in the voids of the concrete, offers strong resistance to heat rays, ultraviolet rays, carbon dioxide and carbon monoxide in the ambient air, with the result that the concrete structure will exhibit high weather-ability and stability. When the concrete structure enters the stage of ample if not perfect stability on lapse of three months (90 days$\approx$13 weeks) after the treatment, the curing effect of the treatment will be retained intact within the structure for a long period of time.

When the surface of the concrete structure is to be additionally coated at a later day, since the substrate has been thoroughly treated to repel moisture, water and other defiling matter, there is no need for giving any primer treatment thereto. Moreover, since the agent gives the concrete structure a more thorough coat than an ordinary primer, it protects the additionally applied overcoat such as mortar, decorative paint, resin tiles or textile wall covering from the substrate. Thus, the agent of this invention enables the overcoat to double its service life.

Since the agent of this invention is not intended to form a coat on the surface of the concrete structure but is designed to penetrate deeply into the concrete structure and fill up the voids distributed therein, it has an advantage that the concrete structure treated therewith can be additionally coated without requiring its surface to be cleaned in advance of the additional coating.

Moreover, since the agent of this invention forms a watertight layer below the surface of the concrete structure and repels water of a pressure of up to 3 kg/cm$^2$, it perfectly precludes the possibility of water penetrating into the concrete structure, coming into contact with lime contained within the concrete structure and consequently forming calcium hydroxide. This means that the agent all the more increases the service life of the concrete structure by perfectly curbing the phenomenon of neutralization which proceeds chemically as described above and ends up in noiseless destruction of the concrete structure. This invention, accordingly, provides an epochal surface-coating sealing-curing agent wich ensures prolonged repression of the quick drying otherwise liable to occur in the early stage following the placement of concrete and warrants perfect prevention of the occurrence of cracks due to drying and shrinking.

I claim:

1. A polymerized solute for incorporating with 60-70 percent by weight of a petroleum-derived solvent to form a sealing-curing composition for protecting concrete against initial drying, shrinkage and consequently forming of cracks in the formed concrete comprising, in proportion by weight, of 12-18 percent of lanolin; 6-9 percent of zinc naphlenate; 2-5 percent of a high molecular weight synthetic resin selected from the group consisting of a styrene resin, an acryl resin, a melamine resin, an alkyd resin and a urethane resin, and 10-20 percent of a petroleum solvent, said solute being polymerized by application of heat at an acceptable temperature prior to incorporation of said solute with the petroleum-derived solvent.

2. A sealing-curing composition wherein the polymerized solute of claim 1 is incorporated in about 60-70 percent by weight of a petroleum solvent.

3. A sealing-curing solute in accordance with claim 1 wherein about 10 percent of an accelerating agent is added to the solute to accelerate the polymerization thereof.

4. A sealing-curing solute in accordance with claim 1 wherein the polymerized solute comprises the following ingredients by weight proportion:

| Component | Percent by Weight |
|---|---|
| Lanolin | 12-17 |
| Zinc maphthenate | 6-9 |
| Xylol | 10-20 |
| Styrene resin | 2-5. |

5. A sealing-curing composition wherein the polymerized solute of claim 4 is incorporated in about 60-70 percent by weight of kerosene.

6. The method of protecting a formed concrete structure against initial drying, shrinking and consequently forming of cracks in the formed structure and to provide a sealing and curing of the formed structure comprising pouring the concrete to form the desired structure, applying the composition of claim 3 to the wet concrete surface of the formed structure and permitting the treated concrete structure to be cured, said polymer solute of said composition will penetrate and fill voids formed in said concrete structure during the curing thereof.

7. The method of claim 6 wherein the composition applied is the composition of claim 4.

8. The method of claim 6 wherein the surface of the concrete of the formed structure is permitted to reach a dry state after which said surface is treated with water to wet same after which the treating composition is applied to the wetted concrete surface.

* * * * *